US009899057B2

(12) United States Patent
Chan (10) Patent No.: US 9,899,057 B2
(45) Date of Patent: Feb. 20, 2018

(54) CONTROL METHOD FOR SYNCHRONIZED VIDEO, CONTROL SYSTEM FOR SYNCHRONIZED VIDEO AND ELECTRONIC APPARATUS THEREOF

(71) Applicant: Innomind Solution Company Limited, Taichung (TW)

(72) Inventor: Ya-Ting Chan, Changhua County (TW)

(73) Assignee: Innomind Solution Company Limited, Taichung (TW)

( * ) Notice: Subject to any disclaimer, the term of this patent is extended or adjusted under 35 U.S.C. 154(b) by 42 days.

(21) Appl. No.: 15/134,402

(22) Filed: Apr. 21, 2016

(65) Prior Publication Data

US 2017/0213578 A1    Jul. 27, 2017

(30) Foreign Application Priority Data

Jan. 22, 2016  (CN) .......................... 2016 1 0043812

(51) Int. Cl.
| | | |
|---|---|---|
| *H04N 9/80* | (2006.01) | |
| *G11B 27/036* | (2006.01) | |
| *G11B 27/30* | (2006.01) | |
| *G11B 27/10* | (2006.01) | |
| *G11B 27/32* | (2006.01) | |
| *G10H 1/00* | (2006.01) | |

(Continued)

(52) U.S. Cl.
CPC ............ *G11B 27/036* (2013.01); *G11B 27/10* (2013.01); *G11B 27/3081* (2013.01); *G11B 27/323* (2013.01)

(58) Field of Classification Search
CPC .......... H04N 9/80; H04N 5/765; H04N 5/932; G10H 1/00; G10H 3/00; G10H 3/14; G10D 13/12
USPC .......... 386/248, 239, 200, 201, 231; 84/600, 84/601, 723, 730, 411, 414
See application file for complete search history.

(56) References Cited

U.S. PATENT DOCUMENTS 5,864,868 A *  1/1999  Contois ............. G06F 17/30749
8,777,747 B2 *  7/2014  McCauley .............. A63F 13/06
463/37

(Continued)

FOREIGN PATENT DOCUMENTS

| CN | 1504946 | 6/2004 |
|---|---|---|
| CN | 2812170 | 8/2006 |

(Continued)

OTHER PUBLICATIONS

"Office Action of Taiwan Counterpart Application", dated Oct. 4, 2016, p. 1-p. 8.

*Primary Examiner* — Daquan Zhao
(74) *Attorney, Agent, or Firm* — JCIPRNET (57) ABSTRACT

A control method for synchronized video, a control system for synchronized video and an electronic apparatus thereof are provided. The control method for synchronized video includes the following steps. A video file corresponding to an operating instrument is obtained and displayed. Whether a control instruction corresponding to a current video frame of the displayed video file exists is determined. When the control instruction corresponding to the current video frame exists, the control instruction is obtained. Further, the control instruction is output to the operating instrument to control the operating instrument.

15 Claims, 8 Drawing Sheets

(51) Int. Cl.
  *G10H 3/00* (2006.01)
  *G10H 3/14* (2006.01)
  *G10H 3/12* (2006.01)

(56) References Cited

U.S. PATENT DOCUMENTS

2010/0282044 A1   11/2010   Delorme
2013/0068085 A1    3/2013   Yoshikawa

FOREIGN PATENT DOCUMENTS

| CN | 102577366 | 10/2015 |
| TW | 200414771 | 8/2004 |
| TW | 200951895 | 12/2009 |
| TW | 201330600 | 7/2013 |
| TW | 201448582 | 12/2014 |

* cited by examiner

CONTROL METHOD FOR SYNCHRONIZED VIDEO, CONTROL SYSTEM FOR SYNCHRONIZED VIDEO AND ELECTRONIC APPARATUS THEREOF

CROSS-REFERENCE TO RELATED APPLICATION

This application claims the priority benefit of Chinese application serial no. 201610043812.3, filed on Jan. 22, 2016. The entirety of the above-mentioned patent application is hereby incorporated by reference herein and made a part of this specification.

BACKGROUND OF THE INVENTION

Field of the Invention

The invention relates to a control method, a control system and an electronic apparatus thereof, and particularly relates to a control method for synchronized video, a control system for synchronized video and an electronic apparatus thereof.

Description of Related Art

With advances in technology, performing teaching and operating demonstration or being used as a scenery when a specific apparatus actuates through a per-recorded video have already been quite common. For example, when learning a music instrument, the teaching video content is usually about the related techniques and knowledge explained by the teacher and the way of playing the music instrument demonstrated by different music compositions in reality. When students watch the teaching video, they can practice accordingly on their own so as to achieve the effect of the teaching. It should be noted that the teaching video is not only applied to learning music instruments, but applied to usage guidelines of mechanical operations or other types of electronic products.

However, watching the video and playing the music instrument, operating the machines or using the electronic products at the same time may cause the problems of difficult comparison or wrong comparison, thereby resulting in the frustration on learning the music instrument or improperly using the machine or the electronic products. On the other hand, if the video is not synchronized with the actuation of the specific apparatus, it may cause discordant audio-visual effect. Therefore, how to provide a better control method for synchronized video and a better control system for synchronized video to promote the interrelationship between the operating instrument and the video is still one of goals which is worked on by those having ordinary skill in the art.

SUMMARY OF THE INVENTION

The invention provides a control method for synchronized video, a control system for synchronized video, and an electronic apparatus thereof. Whether the control instruction exists is analyzed while the video file is displayed, and the control instruction is correspondingly output to the operating instrument to be synchronized with the video file so as to control the operating instrument, thereby enhancing the interrelationship between the operating instrument and the video.

An embodiment of the invention provides a control method for synchronized video including the following steps. A video file corresponding to an operating instrument is obtained and displayed. Whether a control instruction corresponding to a current video frame of the displayed video file exists is determined. If the control instruction corresponding to the current video frame exists, the control instruction is obtained and output to the operating instrument to control the operating instrument.

Another embodiment of the invention provides a control system for synchronized video. The control system for synchronized video includes a video database, an operating instrument, and a main apparatus. The main apparatus includes a transmission interface, a display unit, and a processing unit. The transmission interface is coupled with the operating instrument and the video database, and the main apparatus uses the video database to obtain a video file corresponding to the operating instrument. The display unit displays the video file. The processing unit is coupled with the transmission interface and the display unit and determines whether a control instruction corresponding to a current video frame of the displayed video file exists. If the control instruction corresponding to the current video frame exists, the processing unit obtains the control instruction and outputs the control instruction to the operating instrument through the transmission interface to control the operating instrument.

Yet another embodiment of the invention provides an electronic apparatus suitable for the main apparatus of the control system for synchronized video. The electronic apparatus includes a transmission interface, a display unit, and a processing unit. The transmission interface is coupled with the operating instrument and the video database, and the electronic apparatus uses the video database to obtain a video file corresponding to the operating instrument. The display unit displays the video file. The processing unit is coupled with the transmission interface and the display unit. The processing unit determines whether a control instruction corresponding to a current video frame of the displayed video file exists. If the control instruction corresponding to the current video frame exists, the processing unit obtains the control instruction and outputs the control instruction to the operating instrument through the transmission interface to control the operating instrument.

Based on the above description, in the control method for synchronized video, the control system for synchronized video, and the electronic apparatus thereof provided by the embodiment of the invention, when the teaching video file of the operating instrument is displayed, whether the control instruction corresponding to the aforementioned video file exists is further analyzed. To be specific, if the control instruction indeed exists, the control instruction corresponding to the display state of the video file is synchronously transmitted to the operating instrument. The operating instrument actuates according to the received control instruction. Thereby, through the coordination of the operating instrument and the video file, the interrelationship between the operating instrument and the video can be enhanced.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the control method for synchronized video, the control system for synchronized video, and the electronic apparatus thereof provided by the embodiment of the invention, when a video file is played, whether there are control instructions corresponding to a plurality of video frames is further determined. The control instruction is such as embedded in the video frame or stored in another one control instruction file. When the video file is displayed, if there is a control instruction corresponding to the displayed current video frame, the control instruction is output to the operating instrument, and the operating instrument actuates according to the received control instruction.

Figure 1:
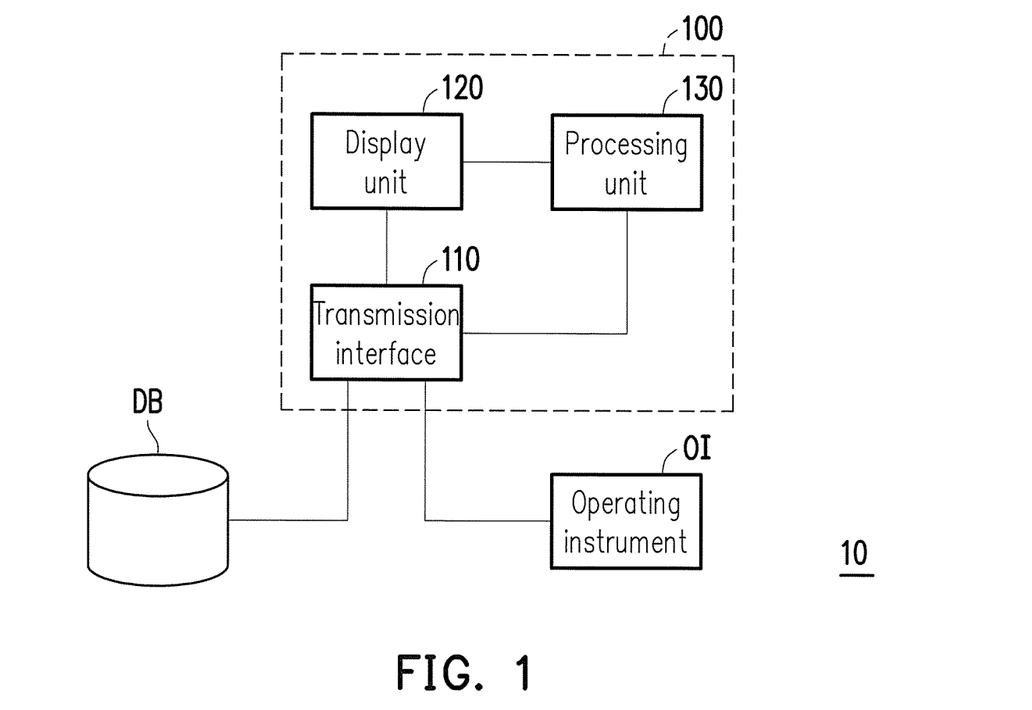
FIG. 1 is a schematic view of a control system for synchronized video according to an embodiment of the invention.

FIG. 1 is a schematic view of a control system for synchronized video according to an embodiment of the invention. Referring to FIG. 1, a control system for synchronized video 10 includes a video database DB, an operating instrument OI, and a main apparatus 100. A plurality of video files are stored in the video database DB, and the aforementioned video files are video files respectively corresponding to different types of the operating instruments OI. Particularly, the video database DB includes an internet video platform or a server for storing video data. The operating instrument IO is such as a music instrument, a mechanical product or an electronic product. In specific, the operating instrument OI is such as an electronic piano, an electronic drum, a digital piano, an electronic guitar or other type of electronic music instrument. On the other hand, the operating instrument is a traditional music instrument in a non-electronic form, for example. In another embodiment, the operating instrument OI is a robot for entertainment, for example. In other embodiments, the operating instrument OI is such as a digital camera, a digital household appliance, an electronic entertainment product or other type of electronic product. However, the invention is not limited thereto.

Figure 2:
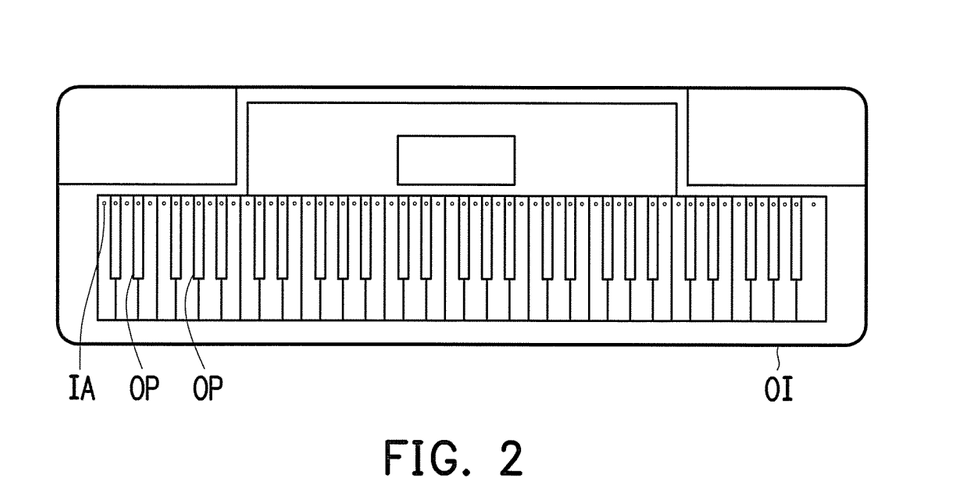
FIG. 2 is a schematic view of an operating instrument according to an embodiment of the invention.

In an embodiment of the invention, the operating instrument OI further includes a plurality of operating portions and a plurality of indicating apparatuses respectively disposed corresponding to the aforementioned operating portions. FIG. 2 is a schematic view of an operating instrument according to an embodiment of the invention. Referring to FIG. 2, when the operating instrument OI is, for example, the electronic piano, a plurality of piano keys of the electronic piano are the operating portions OP, and the indicating apparatuses IA are, for example, a plurality of indicating lights disposed corresponding to the piano keys. In other embodiments of the invention, the operating portions OP and the indicating apparatuses IA of the operating instrument OI may also be integrated in one body. In the case of the aforementioned electronic piano, the piano keys may be integrated with the indicating lights in one body, so that the piano keys themselves have a function for emitting the indicating light. It should be noted that the operating portions OP and the indicating apparatuses IA are different components with the type of the operating instrument OI. For example, if the operating instrument OI is an electronic drum, the operating portion OP is each striking surface of the electronic drum, for example, and the indicating apparatus IA is the indicating light disposed corresponding to the aforementioned striking surface. In summary, when the operating instrument OI is the electronic music instrument or the traditional music instrument in the non-electronic form, the indicating apparatus IA is the indicating light disposed corresponding to the operating portion OP of various types of the music instrument, for example, and the indicating light is composed of light emitting diodes (LED) or other types of light emitting units. On the other hand, the indicating apparatus IA further includes one or more display screens, such as liquid crystal displays (LCD) or other types of display screens, which is built in the operating instrument OI or externally connected to the operating instrument OI.

However, it should be noted that the indicating apparatus IA of the operating instrument OI is not limited to the above description. For another example, if the operating instrument OI is an electronic camera, the operating portions OP are buttons and touch panels of the electronic camera, for example, and the indicating apparatuses IA are the indicating lights and the back light source disposed corresponding to the aforementioned buttons and touch panels.

Figure 3:
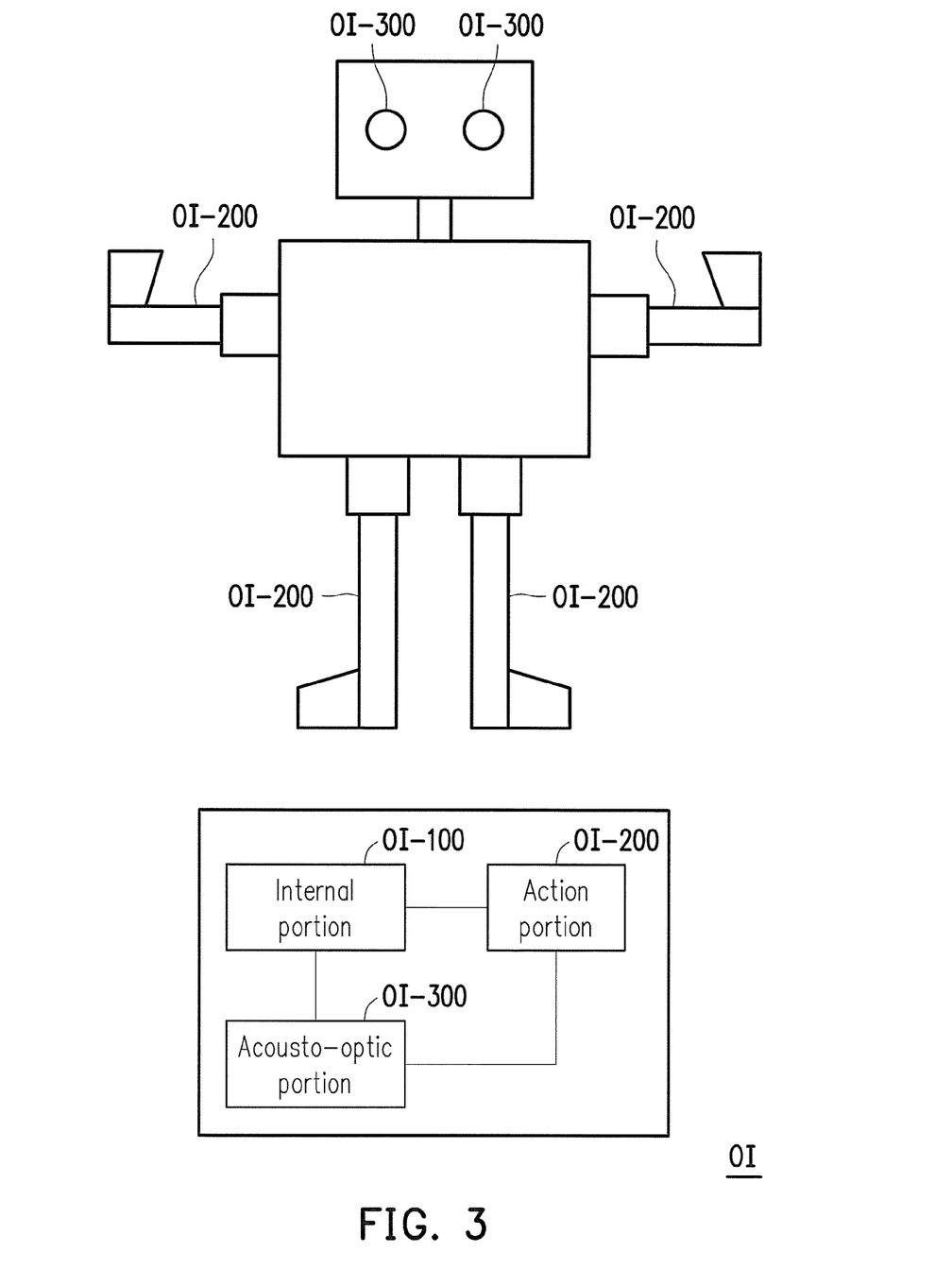
FIG. 3 is a schematic view of an operating instrument according to an embodiment of the invention.

In another embodiment of the invention, the operating instrument OI may not have the aforementioned indicating apparatuses IA and operating portions OP. FIG. 3 is a schematic view of an operating instrument according to an embodiment of the invention. Referring to FIG. 3, the operating instrument OI is a robot, for example. The aforementioned robot is suitable for public entertainment. However, the invention is not limited thereto. In the embodiment, the operating instrument OI has an internal portion OI-100, an action portion OI-200, and an acousto-optic portion OI-300. The internal portion OI-100 is coupled with the action portion OI-200 and the acousto-optic portion OI-300. The internal portion OI-100 includes such as a transmission interface, a processing unit, and other components. The action portions OI-200 are four limbs of the robot, for example, and the acousto-optic portions OI-300 are lightings and speakers on the robot, for example. Particularly, the action portion OI-200 and the acousto-optic portions OI-300 actuate, flash or play sound based on the control of the internal portion OI-100.

Referring to FIG. 1, the main apparatus 100 includes a transmission interface 110, a display unit 120, and a processing unit 130. In the embodiment, the main apparatus 100 is independent outside of the video database DB and the operating instrument OI, and the main apparatus 100 is an electronic apparatus such as a tablet computer, a smart phone, or a computer. However, in another embodiment of the invention, the main apparatus 100 may be integrated with the video database DB and the operating instrument OI in one body, and the operating instrument OI is a main body. In yet another embodiment of the invention, the main apparatus 100 may be integrated only with the operating instrument OI in one body, and the video database DB is independent outside of the main apparatus 100 and the operating instrument OI.

The transmission interface 110 is respectively coupled to the operating instrument OI and the video database DB by wire or wireless means. In specific, the transmission interface 110 is a wireless transmission interface for supporting such as bluetooth, WiFi, worldwide interoperability for microwave access (WiMax), near field communication (NFC), long term evolution (LTE), and other wireless communication standards. In other embodiments, the transmission interface 110 further includes the wire transmission interface which is line-connected through asymmetric digital subscriber line (ADSL), or a cable modem.

The display unit 120 is such as a liquid crystal display (LCD), a light emitting diode (LED) display, and other type of display unit to display video files. The processing unit 130 is coupled with the transmission interface 110 and the display unit 120. The processing unit 130 is such as a central processing unit (CPU), a programmable microprocessor for general purpose or special purpose, a digital signal processor (DSP), a programmable controller, a similar component, or a combination of the above components.

Figure 4:
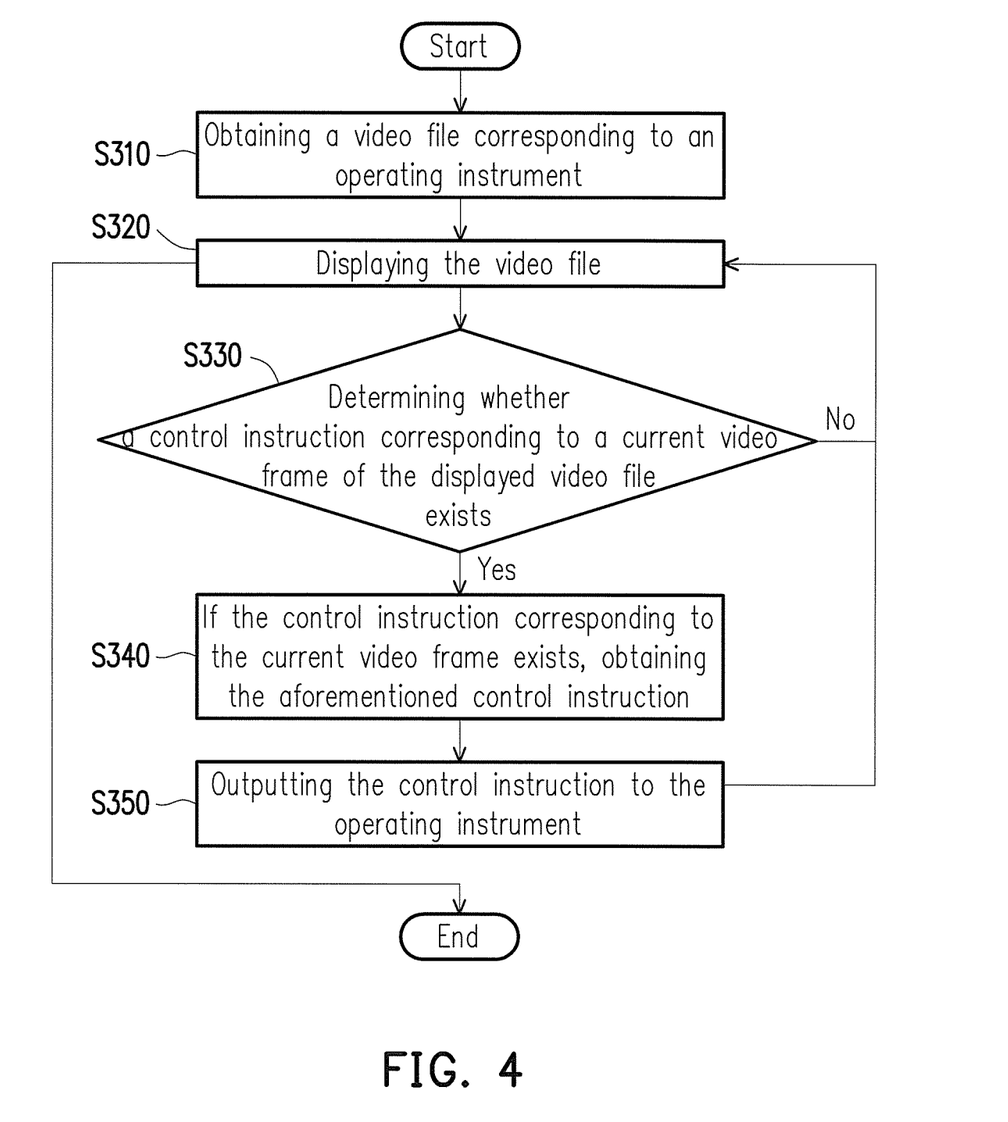
FIG. 4 is a flowchart of a control method for synchronized video according to an embodiment of the invention.

FIG. 4 is a flowchart of a control method for synchronized video according to an embodiment of the invention. The control method for synchronized video as shown in FIG. 4 is suitable for the control system for synchronized video as shown in FIG. 1. However, the invention is not limited thereto. Referring to FIG. 1 and FIG. 4, in the control method for synchronized video, the main apparatus 100 obtains the video file corresponding to the operating instrument OI assisted by the transmission interface 110, the processing unit 130, and other components (step S310). To be specific, the video file is such as a teaching video for learning, a teaching video for using, or other corresponding video of the operating instrument OI. The video file is stored in the video database DB, for example, or the video file is obtained through further processing from the original teaching video in the video database DB. However, the invention is not limited thereto. Then, the display unit 120 of the main apparatus 100 displays the video file (step S320). It should be noted that, if the operating instrument OI has the indicating apparatus IA for displaying screen type, the aforementioned video file may be displayed by the indicating apparatus IA for displaying screen type. In general, the video file is composed of multiple continuous video frames. Therefore, in the process of displaying the video file, the processing unit 130 determines whether a control instruction corresponding to one current video frame of the displayed video file exists (step S330).

To be specific, in the process of displaying the video file, whether the corresponding control instruction exists is determined by the processing unit 130 for the video frame which is currently displaying in the display unit 120, or for the video frame which is to be displayed in the display unit 120. If the control instruction corresponding to the aforementioned case of the current video frame does not exist, the control method for synchronized video returns to the aforementioned step S320, and the video file is continuously displayed by the display unit 120. However, if the control instruction corresponding to the aforementioned case of the current video frame exists, the processing unit 130 further obtains the control instruction (step S340).

As mentioned above, the control instruction is obtained and used by the main apparatus 100 to control the operating instrument. In an embodiment of the invention, when the operating instrument OI is the operating instrument comprising a plurality of operating portions OP and a plurality of indicating apparatuses IA corresponding to the operating portions OP, the operating instrument OI transmits a guide information by the indicating apparatuses IA in line with the current video frame displayed by the display unit 120 according to the received control instruction. Particularly, in the aforementioned embodiments, the operating instrument OI is the electronic music instrument such as the electronic piano, the electronic drum, the digital piano, or the electronic guitar, the traditional music instrument in the non-electronic form such as a piano, or a guitar, or the electronic product which can be operated, such as a digital camera, or a digital household appliance.

Referring to FIG. 2, in the case that the electronic piano is used as the operating instrument OI, and it is assumed that there are 88 piano keys, which are used as the operating portions OP. Each piano key is accompanied by an indicating light, and the indicating light is capable of displaying multicolor and used as the indicating apparatus IA. At this time, the control instruction is composed of such as an 8-bit main instruction and 88 2-bit operating portion data, and each operating portion data are corresponding to one piano key (operating portion OP). The main instruction is used to indicate each hardware configuration of the operating instrument OI, such as overall volume, power switch, color of the indicating light, types of accompaniment, as an example of the electronic piano. On the other hand, operating portion data are used to indicate such as pressing strength of the piano key and on and off of the indicating light. Based on the above description, the control instruction requires a total of 23 bytes of storage space in the present example.

In another embodiment of the invention, when the operating instrument OI is the robot as shown in FIG. 3, the internal portion OI-100 of the operating instrument OI receives the control instruction in line with the current video frame displayed by the display unit 120, and the internal portion OI-100 controls the action portion OI-200 and the acousto-optic portion OI-300, so that the operating instrument OI actuates, flashes or plays sound. The control instruction is composed of segments with different length of bits, and each segment respectively is corresponding to a different action portion OI-200 and acousto-optic portion OI-300. The internal portion OI-100 respectively controls the action portion OI-200 and the acousto-optic portion OI-300 according to each instruction segment.

Figure 5:
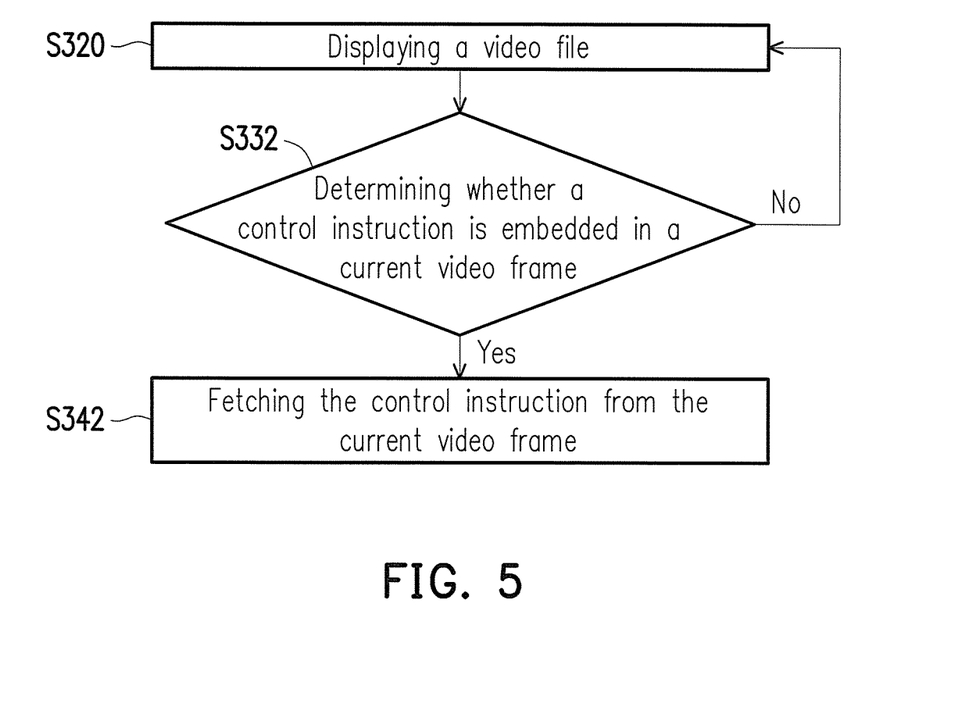
FIG. 5 is a flowchart for obtaining a control instruction according to an embodiment of the invention.
Figure 6:
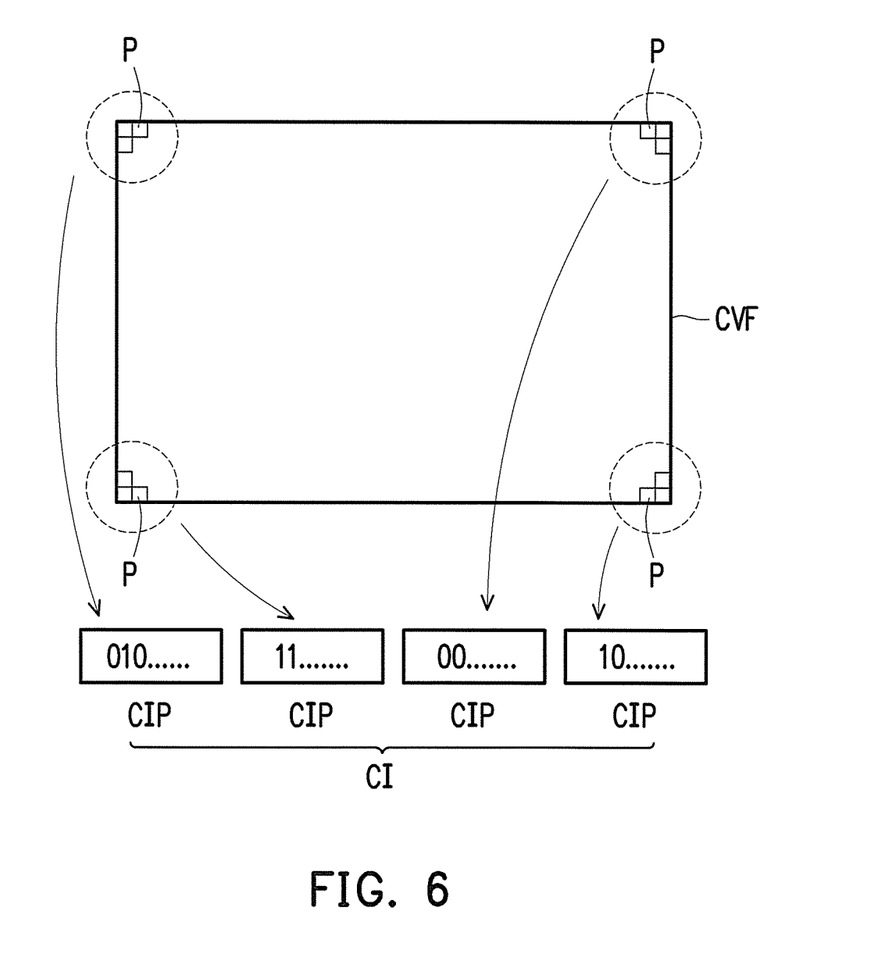
FIG. 6 is a schematic view of a control instruction embedded in a video frame according to an embodiment of the invention.

FIG. 5 is a flowchart for obtaining a control instruction according to an embodiment of the invention. FIG. 6 is a schematic view of a control instruction embedded in a video frame according to an embodiment of the invention. Referring to FIG. 1, FIG. 4, FIG. 5, and FIG. 6, the control instruction CI is mainly embedded in the video frame in the present embodiment. Therefore, when the display unit 120 displays the video file (step S320), the processing unit 130 determines whether the control instruction is embedded in the current video frame (step S332). If the control instruction is indeed embedded in the current video frame, the processing unit 130 fetches the control instruction from the current video frame (step S342).

In general, the video file usually has 30 or 60 video frames per second. When the video frame is defined in the redgreen-blue (RGB) color system, one pixel of each video frame is usually occupied 3 bytes of space to store the corresponding video data segment. However, the invention is not limited thereto. In other embodiments, the video frame may be defined in the hue-saturation-value (HSV) color system, the hue-saturation-lightness (HSL) color system, the luma and chroma (YUV) color system, or other color system, and the storage space occupied by one pixel of one video frame to store the video data segment is different according to the color system which is defined thereby. Therefore, as an example of the red-green-blue color system as shown in FIG. 6, for a video frame CVF which is currently displaying or to be displayed, the control instruction CI may be embedded in the video frame CFV in a way of replacing a portion of pixel P. For example, if the control instruction CI is 23 bytes in size, at least 8 pixels P of the video data segment is required to be sacrificed, and a plurality of instruction segments CIP of the control instruction are respectively written to the aforementioned pixels P. In other words, the data segments corresponding to the aforementioned pixels P are changed into a plurality of instruction segments CIP corresponding to the control instruction. In order to avoid causing interference to the current video frame CFV, the pixels P for embedding the instruction segments CIP may be located at four corners of the current video frame CFV. The processing unit 130 obtains the complete control instruction CI by rearranging the plurality of instruction segments CIP stored by the aforementioned pixels.

However, the control instruction is not necessarily embedded in the video frame. In another embodiment of the invention, all control instructions of the video file are collected in one control instruction file, for example. To be specific, the control instruction file includes the aforementioned control instructions and the transmission time points corresponding to each of the control instruction.

Figure 7:
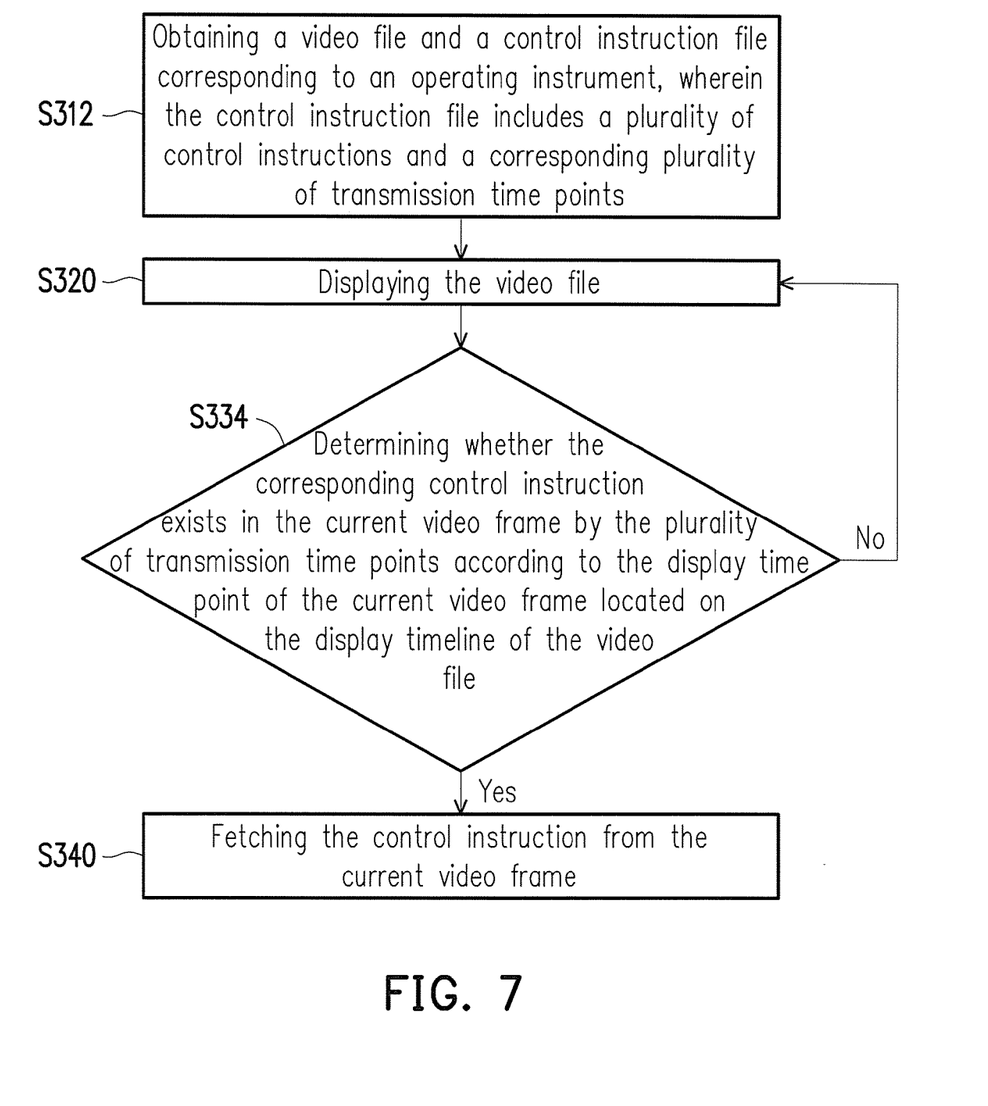
FIG. 7 is a flowchart for obtaining a control instruction according to another embodiment of the invention.

FIG. 7 is a flowchart for obtaining a control instruction according to another embodiment of the invention. Referring to FIG. 1, FIG. 4, and FIG. 7, the main apparatus 100 obtains the video file and the control instruction file corresponding to the operating instrument OI first by using the transmission interface 110 (step S312). Then, the display unit 120 displays the video file (step S320). When the video file is displayed, the processing unit 130 determines whether the corresponding control instruction exists in the current video frame by the plurality of transmission time points recorded in the control instruction file according to the display time point of the displayed current video frame located on the display timeline of the video file (step S334). In other words, the processing unit 130 compares the display time point of the current video frame located on the display timeline of the video file with the transmission time points of the plurality of control instructions. If there is a match transmission time point, it means that the control instruction corresponding to the current video frame exists. At this time, the processing unit 130 obtains the aforementioned control instruction from the control instruction file (step S340). Then, during the display of the current video frame, the processing unit 130 transmits the corresponding control instruction to the operating instrument OI.

Referring to FIG. 4 again, after obtaining the control instruction (step S340), the processing unit 130 further outputs the control instruction to the operating instrument OI to control the operating instrument (step S350). After the operating instrument OI receives the control instruction, the operating instrument OI actuates in line with the current video frame according to the control instruction.

Figure 8:
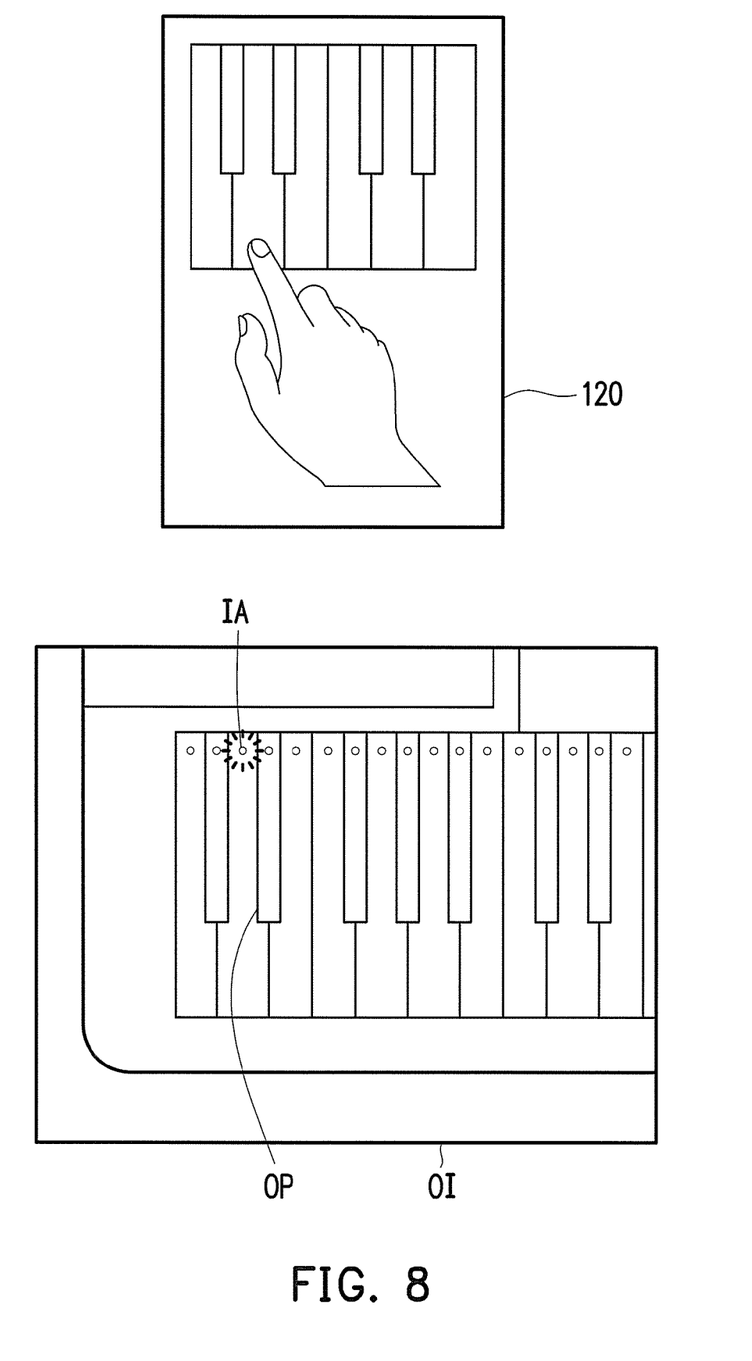
FIG. 8 is a schematic view of a guide information according to an embodiment of the invention.

In an embodiment of the invention, after the operating instrument OI receives the control instruction, the operating instrument OI transmits the guide information by the plurality of indicating apparatus in line with the current video frame according to the control instruction. FIG. 8 is a schematic view of a guide information according to an embodiment of the invention. In the case that the electronic piano is used as the operating instrument OI as shown in FIG. 2. In FIG. 8, when the current video frame displayed by the display unit 120 is one of the plurality of the piano keys being pressed, the operating instrument OI flashes the indicating light (indicating apparatus IA) of the piano key (operating portion OP) at the same position according to the control instruction synchronously. By flashing the indicating light to indicate the piano key which should be pressed, the control system for synchronized video 10 may guide the learning process of the electronic piano with the progress of the current video frame. However, the invention is not limited thereto. In another embodiment of the invention, when the current video frame displayed by the display unit 120 is one of the plurality of the piano keys being pressed, the operating instrument OI plays a sound of the corresponding piano key according to the control instruction synchronously so as to indicate the piano key which should be pressed, for example. In yet another embodiment of the invention, when the current video frame displayed by the display unit 120 is one of the plurality of the piano keys being pressed, the operating instrument OI flashes the indicating light and plays the sound of the corresponding piano key according to the control instruction synchronously, for example. Obviously, in the aforementioned embodiments, the guide information is such as a flash of the indicating light and a sound of the piano key. After the control instruction is output to the operating instrument OI, the display unit 120 still displays the video file continuously (step S320), and the processing unit 130 repeatedly checks whether there is the corresponding control instruction in the subsequent displayed video frame to determine whether performing drawing out and transmission of the control instruction until the video file is completely displayed.

It should be noted that, in another embodiment of the invention, when the operating instrument OI is the robot, the electronic robot may actuate according to the received control instruction and generate entertainment effect with the video file which is synchronously displayed after receiving the control instruction. Particularly, after the internal portion OI-100 of the operating instrument OI receives the control instruction, the action portion OI-200 and the acousto-optic portion OI-300 are correspondingly controlled to actuate, flash or play sound by the internal portion OI-100.

Figure 9:
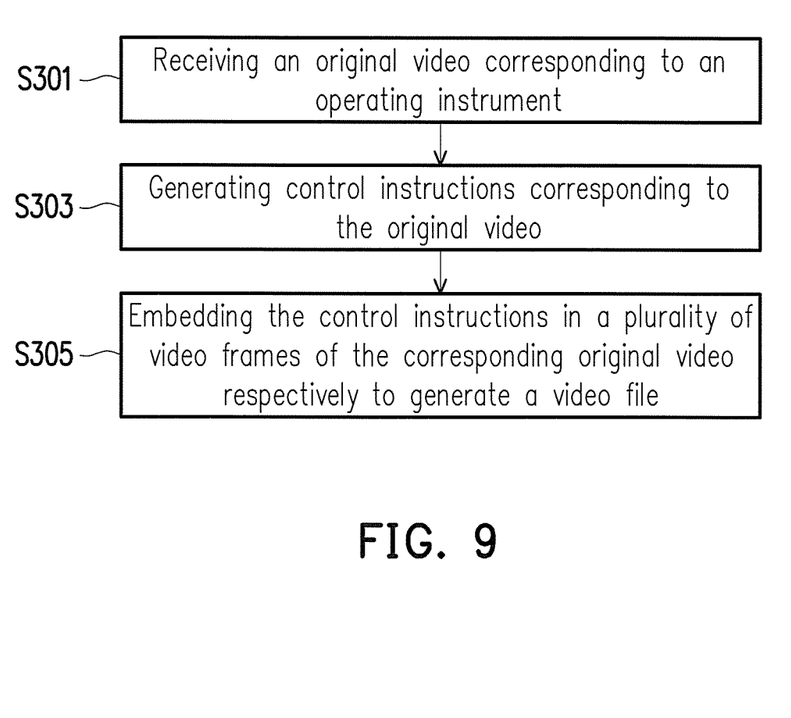
FIG. 9 is a flowchart for obtaining a video file according to another embodiment of the invention.

In the aforementioned embodiments, the video file of the operating instrument OI has a corresponding plurality of control instructions, for example. In the present invention, special users such as teachers, directors, or designers may generate the control instructions reversely by operating the aforementioned operating instrument OI. Particularly, the main apparatus 100 may receive an original teaching video without control instructions and other related control instruction files from the video database DB or other sources, and then self-generate the control instructions or the control instruction files. FIG. 9 is a flowchart for obtaining a video file according to another embodiment of the invention. Referring to FIG. 9, the main apparatus 100 uses the transmission interface 110 to receive the original video corresponding to the operating instrument OI from, for example, the video database DB (step S301). The processing unit 130 generates the plurality of control instructions corresponding to the original video (step S303), and the control instructions are respectively embedded in the plurality of video frames of the corresponding original video to generate the video file (step S305). Therefore, the control instruction is embedded in the obtained video file.

In the control system for synchronized video 10, how to generate the control instruction corresponding to the video file based on the feedback of the operating instrument OI by the aforementioned special users is described below with an exemplary embodiment. In an embodiment of the invention, after the display unit 120 displays the original video, the main apparatus 100 receives the operating information sent back from the operating instrument OI through the transmission interface 110. In the case of the electronic piano (operating instrument OI) as shown in FIG. 2, if the teachers, the directors, or the designers watch the original video and press the piano keys (operating portion OP) following the video content, a combination of the piano keys pressed corresponding to each current video frame will be used as the operating information and then sent back to the main apparatus 100. In other words, the operating information is the operating situation of the aforementioned personnel on the operating portion OP, and the operating information may be directly received by the processing unit 130 of the main apparatus 100 in an electronic signal form. After the original video is completely displayed, the processing unit 130 generates the plurality of control instructions corresponding to the original video from the received operating information based on that the corresponding control instruction does not exist in the original video, wherein the aforementioned control instructions are respectively corresponding to the plurality of video frames. Besides, the original video and the corresponding control instruction are embedded and combined by the main apparatus 100 to generate the video file, and then stored to the video database DB. Thereby, the special users such as the teachers, the directors, or the designers may self-generate the video file having the control instruction.

In an embodiment of the invention, the control system for synchronized video 10 and the main apparatus 100 may also be used for the real-time teaching. In the embodiment, the control system for synchronized video 10 further includes a photographic apparatus (not shown), for example, and the users such as a teacher and at least one student may respectively use one set of the main apparatus 100 and the operating instrument OI. When the teacher operates the operating instrument OI, the operation of the teacher on the operating portion OP is converted into the video by the main apparatus 100 of the teacher terminal through the photographic apparatus and the transmission interface 110. On the other hand, the operation of the teacher on the operating portion OP is also converted into the operating information, and then the processing unit 130 of the teacher terminal receives the operating information and generates the control instruction corresponding to the aforementioned video. For example, when the operating instrument OI is the piano, the operation of the teacher on the piano keys may be converted into the electronic information, and then the electronic information is received and recognized by the processing unit 130. In an embodiment of the invention, the processing unit 130 may further combine with the control instruction in the aforementioned recorded video to generate the video file, and the video file combined with the control instruction is instantly transmitted to the main apparatus 100 of the student terminal through the transmission interface 110. It should be noted that in another embodiment, the processing unit 130 of the teacher terminal may obtain the operating situation of the teacher on the operating portion OP by analyzing the video of the photographic apparatus so as to generate the control instruction.

After the video file combined with the control instruction is received by the main apparatus 100 of the student terminal, the related control instruction is fetched. Then, the control instruction is output to the operating instrument OI used by the student, and the guide information is transmitted with the aforementioned video file. Thereby, the student can instantly learn following the operation of the teacher. In another embodiment of the invention, the main apparatus 100 of the student terminal may receive the original operating video without the control instruction embedded therein from the main apparatus 100 of the teacher terminal, and then the original operating video is analyzed by the processing unit 130 of the main apparatus 100 of the student terminal. Thereby, the control instruction corresponding to the original operating video is generated. Thereafter, the student is guided for the learning of the operating instrument OI by the main apparatus 100 of the student terminal according to the operating video and the self-generated control instruction.

In summary, in the control method for synchronized video, the control system for synchronized video, and the electronic apparatus thereof provided by the embodiment of the invention, when the corresponding video file of the operating instrument is displayed, whether the control instruction corresponding to the aforementioned video file exists is further analyzed. The control instruction is such as embedded in the video frame or included in the control instruction file. If the control instruction indeed exists, the control instruction corresponding to the display state of the video file is synchronously transmitted to the operating instrument. The operating instrument actuates according to the received control instruction, such as transmitting the guide information or entertaining the public by self-acting, flashing, and playing sounds. Thereby, through the coordination of the operating instrument and the video file, the interrelationship between the operating instrument and the video can be enhanced.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A control method for synchronized video, comprising:
    obtaining a video file corresponding to an operating instrument;
    displaying the video file;
    determining whether a control instruction corresponding to a current video frame of the displayed video file is embedded in the current video frame;
    fetching the control instruction from the current video frame when the control instruction is embedded in the current video frame; and
    outputting the control instruction to the operating instrument to control the operating instrument.

2. The control method for synchronized video according to claim 1, wherein data segments corresponding to a portion of pixels of the current video frame are respectively a plurality of instruction segments of the control instruction.

3. The control method for synchronized video according to claim 1, wherein the step of obtaining the video file further comprises:

obtaining a control instruction file, wherein the control instruction file comprises a plurality of the control instructions and a corresponding plurality of transmission time points, and the step of determining whether the control instruction exists further comprises:

determining whether the corresponding control instruction exists by the transmission time points in the control instruction file according a display time point of the current video frame located on a display timeline of the video file.

4. The control method for synchronized video according to claim 1, wherein the step of obtaining the video file corresponding to the operating instrument further comprises:

receiving an original video corresponding to the operating instrument;

generating the control instructions corresponding to the original video; and embedding the control instructions in a corresponding plurality of video frames of the original video respectively so as to generate the video file.

5. The control method for synchronized video according to claim 1, wherein the operating instrument transmits a guide information in line with the current video frame according to the received control instruction.

6. The control method for synchronized video according to claim 5, wherein the operating instrument is a music instrument, and the music instrument comprises an electronic piano.

7. The control method for synchronized video according to claim 1, wherein the operating instrument is a robot.

8. A control system for synchronized video, comprising:
a video database;
an operating instrument; and
a main apparatus, comprising:
a transmission interface, coupled with the operating instrument and the video database, and the main apparatus uses the video database to obtain a video file corresponding to the operating instrument;
a display, displaying the video file; and
a processor, coupled with the transmission interface and the display, determining whether a control instruction corresponding to a current video frame of the displayed video file exists, obtaining the control instruction when the control instruction corresponding to the current video frame exists, and outputting the control instruction to the operating instrument through the transmission interface to control the operating instrument,
wherein the processor determines whether the control instruction is embedded in the current video frame, and the processor fetches the control instruction from the current video frame when the control instruction is embedded in the current video frame.

9. The control system for synchronized video according to claim 8, wherein data segments corresponding to a portion of pixels of the current video frame are respectively a plurality of instruction segments of the control instruction.

10. The control system for synchronized video according to claim 8, wherein when the transmission interface obtains the video file, the transmission interface further obtains a control instruction file, and the control instruction file comprises a plurality of the control instructions and a corresponding plurality of transmission time points, the processor determines whether the corresponding control instruction exists by the transmission time points in the control instruction file according to a display time point of the current video frame located on a display timeline of the video file.

11. The control system for synchronized video according to claim 8, wherein the transmission interface receives an original video corresponding to the operating instrument from the video database, and the processor generates the control instructions corresponding to the original video and the control instructions are respectively embedded in a plurality of video frames of the corresponding original video to generate the video file.

12. The control system for synchronized video according to claim 8, wherein the operating instrument comprises a plurality of operating portions and a plurality of indicating apparatuses corresponding to the operating portions, the operating instrument transmits a guide information by the indicating apparatuses in line with the current video frame displayed by the display according to the received control instruction.

13. The control system for synchronized video according to claim 12, wherein the operating instrument is a music instrument, and the music instrument comprises an electronic piano, wherein when the operating instrument is the electronic piano, the operating portions comprise a plurality of piano keys of the electronic piano, and the indicating apparatuses comprise a plurality of indicating lights corresponding to the plurality of piano keys.

14. The control system for synchronized video according to claim 8, wherein the operating instrument is a robot.

15. An electronic apparatus, adapted to be used as a main apparatus of a control system for synchronized video, the electronic apparatus comprising:

a transmission interface, coupled with an operating instrument and a video database, and the electronic apparatus uses the video database to obtain a video file corresponding to the operating instrument;

a display, displaying the video file; and a processor, coupled with the transmission interface and the display, determining whether a control instruction corresponding to a current video frame of the displayed video file exists, obtaining the control instruction when the control instruction corresponding to the current video frame exists, and outputting the control instruction to the operating instrument through the transmission interface to control the operating instrument, wherein the processor determines whether the control instruction is embedded in the current video frame, and the processor fetches the control instruction from the current video frame when the control instruction is embedded in the current video frame.

* * * * *